(12) United States Patent
Ravinel

(10) Patent No.: US 10,451,219 B2
(45) Date of Patent: Oct. 22, 2019

(54) METHOD AND DEVICE FOR FILLING A HYDROGEN TANK

(71) Applicant: L'Air Liquide, Societe Anonyme pour l'Etude et l'Exploitation des Procedes Georges Claude, Paris (FR)

(72) Inventor: Baptiste Ravinel, Grenoble (FR)

(73) Assignee: L'Air Liquide Societe Anonyme Pour L'Etude Et L'Exploitation Des Procedes Georges Claude, Paris (FR)

( * ) Notice: Subject to any disclaimer, the term of this patent is extended or adjusted under 35 U.S.C. 154(b) by 148 days.

(21) Appl. No.: 15/548,989

(22) PCT Filed: Jan. 28, 2016

(86) PCT No.: PCT/FR2016/050178
§ 371 (c)(1),
(2) Date: Aug. 4, 2017

(87) PCT Pub. No.: WO2016/124838
PCT Pub. Date: Aug. 11, 2016

(65) Prior Publication Data
US 2018/0023763 A1    Jan. 25, 2018

(30) Foreign Application Priority Data

Feb. 4, 2015 (FR) ...................... 15 50847

(51) Int. Cl.
*F17C 5/00* (2006.01)
*F17C 5/06* (2006.01)
(Continued)

(52) U.S. Cl.
CPC ............... *F17C 5/007* (2013.01); *F17C 5/04* (2013.01); *F17C 5/06* (2013.01); *F17C 7/00* (2013.01);
(Continued)

(58) Field of Classification Search
CPC ...... F17C 5/04; F17C 7/00; F17C 5/06; F17C 2250/072; F17C 2250/0636;
(Continued)

(56) References Cited

U.S. PATENT DOCUMENTS

| 2003/0031970 A1* | 2/2003 | Shimada | ................. F23C 13/00 431/204 |
| 2007/0257043 A1* | 11/2007 | Kanoya | ..................... F17C 5/06 220/581 |

(Continued)

FOREIGN PATENT DOCUMENTS

| EP | 1 935 844 | 6/2008 |
| EP | 2 175 187 | 4/2010 |

(Continued)

OTHER PUBLICATIONS

International Search Report and Written Opinion for PCT/FR2016/050178, dated May 17, 2016.
(Continued)

*Primary Examiner* — Ana M Vazquez
(74) *Attorney, Agent, or Firm* — Christopher J. Cronin

(57) ABSTRACT

A method for filling a tank with pressurized gaseous hydrogen from at least one source storage containing pressurized gaseous hydrogen at a first defined temperature and at a defined pressure higher than the pressure in the tank to be filled, in which hydrogen is transferred from the source storage to the tank by pressure balancing via a filling circuit having an upstream end linked to the source storage and a downstream end linked to the tank, and in which the at least one source storage exchanges heat with a member for heating the gas stored in the source storage, during at least a part of the transfer of hydrogen from the source storage to
(Continued)

the tank, the gas contained in the source storage being heated to a second defined temperature that is higher than the first temperature.

13 Claims, 1 Drawing Sheet

(51) Int. Cl.
F17C 7/00 (2006.01)
F17C 5/04 (2006.01)
F17C 13/02 (2006.01)
G05D 23/20 (2006.01)

(52) U.S. Cl.
CPC ......... *F17C 13/02* (2013.01); *G05D 23/2033* (2013.01); *F17C 2205/0326* (2013.01); *F17C 2221/012* (2013.01); *F17C 2223/0123* (2013.01); *F17C 2223/036* (2013.01); *F17C 2225/0123* (2013.01); *F17C 2225/036* (2013.01); *F17C 2227/0157* (2013.01); *F17C 2227/0309* (2013.01); *F17C 2227/0341* (2013.01); *F17C 2227/0372* (2013.01); *F17C 2227/0388* (2013.01); *F17C 2250/032* (2013.01); *F17C 2250/043* (2013.01); *F17C 2250/0434* (2013.01); *F17C 2250/0491* (2013.01); *F17C 2250/0626* (2013.01); *F17C 2250/0631* (2013.01); *F17C 2250/0636* (2013.01); *F17C 2250/072* (2013.01); *F17C 2260/025* (2013.01); *F17C 2265/065* (2013.01); *F17C 2270/0139* (2013.01); *Y02E 60/321* (2013.01); *Y02P 90/45* (2015.11)

(58) Field of Classification Search
CPC ...... F17C 2250/0626; F17C 2250/0491; F17C 2250/0434; F17C 2250/043; F17C 2250/032; F17C 2227/0388; F17C 2227/0341; F17C 2227/0309; F17C 2225/036; F17C 2225/0123; F17C 2260/025; F17C 2227/0372; Y02P 90/45; Y02E 60/321

See application file for complete search history.

(56) References Cited

U.S. PATENT DOCUMENTS

| 2009/0119033 A1* | 5/2009 | Hirose | G01F 22/02 702/55 |
| 2010/0012219 A1* | 1/2010 | Shibukawa | F17C 5/06 141/4 |
| 2010/0307636 A1 | 12/2010 | Uemura | |
| 2013/0305744 A1 | 11/2013 | Laursen et al. | |

FOREIGN PATENT DOCUMENTS

| FR | 3 006 742 | 12/2014 |
| WO | WO 2011 026551 | 3/2011 |

OTHER PUBLICATIONS

French Search Report and Written Opinion for FR 1 550 847, dated Dec. 10, 2015.

* cited by examiner

METHOD AND DEVICE FOR FILLING A HYDROGEN TANK

CROSS-REFERENCE TO RELATED APPLICATIONS

This application is a § 371 of International PCT Application PCT/FR2016/050178, filed Jan. 28, 2016, which claims § 119(a) foreign priority to French patent application FR 1550847, filed Feb. 4, 2015.

BACKGROUND

Field of the Invention

The present invention relates to a method and a device for filling a hydrogen tank.

The invention relates more particularly to a method for filling a pressurized gaseous hydrogen tank from at least one source store containing a pressurized gaseous hydrogen at a determined first temperature and at a determined pressure higher than the pressure in the tank that is to be filled, in which method hydrogen is transferred from the source store to the tank by the equalizing of pressure via a filling circuit having an upstream end connected to the source store and a downstream end connected to the tank, and in which the at least one source store is in a heat exchange relationship with a member for heating up the gas stored in the source store.

Related Art

The filling of fuel tanks with gaseous hydrogen is generally performed via one and preferably several equalizings of pressure between one or more source stores and the tank that is to be filled. One well known solution uses several source stores coupled in parallel which are used in succession to maximize the pressure differences between the source and the tank that is to be filled (what is known as "cascade" filling).

A compressor may also be provided, as a top-up, to supplement or complete the filling if necessary.

There are a number of known techniques for optimizing the quantity of gas transferred in the given filling time.

Thus, it is known practice to control the flow rate of gas transferred in order to minimize the heating-up that occurs in the tank filled. By reducing the gas transfer flow rate the risks of excessive heating-up in the tank are limited but the filling time is lengthened.

Another known solution is to cool the gas before it enters the tank so as to minimize/control the rise in temperature in the tank. However, this solution may require significant energy resources. Document EP2175187A2 describes a filling system in which the temperature of the gas is controlled (lowered) before it enters the tank.

Document WO2011026551A1 itself describes a filling system in which the temperature of the source stores is maintained at a determined low level.

SUMMARY OF THE INVENTION

It is one object of the present invention to improve the efficiency of the filling and/or to alleviate all or some of the disadvantages of the prior art as noted hereinabove.

To this end, the filling method according to the invention, in other respects in accordance with the generic definition thereof given in the above preamble, is essentially characterized in that, during at least part of the transfer of hydrogen from the source store to the tank, the gas contained in the source store is heated up to a determined second temperature which is higher than the first temperature.

What that means to say is that, during the filling and/or prior to at least part of the filling, the at least one source store is heated up to increase the pressure of the gas in the store so as to increase the pressure differential with respect to the tank that is to be filled.

For preference, this heating is performed when the pressure in the source store drops below a determined low threshold and/or when the pressure within the tank during the course of filling reaches a determined high threshold.

Moreover, some embodiments of the invention may include one or more of the following features:
- the heating-up of the gas contained in the source store increases its temperature by a determined amount comprised between 10° C. to 60° C. and preferably between 20° C. to 40° C.,
- during the transfer of hydrogen from the source store to the tank when the pressure differential between, on the one hand, the gas in the source store and, on the other hand, the gas in the tank, is below a determined first differential, the gas contained in the source store is heated up via the heating member,
- the gas contained in the source store is heated up only when the pressure differential between, on the one hand, the gas in the source store and, on the other hand, the gas in the tank, is below said determined first differential,
- the determined first differential is comprised between 50 and 250 bar and preferably comprised between 100 and 200 bar,
- during the transfer of hydrogen from the source store to the tank, when the pressure differential between, on the one hand, the gas in the source store and, on the other hand, the gas in the tank, is above a determined second differential, the gas contained in or withdrawn from the source store is cooled,
- the cooling of the gas contained in the source store reduces its temperature by 10° C. to 60° C. and preferably by 20° C. to 40° C.,
- the gas in the source store has an initial pressure prior to filling and prior to heating comprised between 150 and 950 bar and notably between 250 and 850 bar.

The invention also relates to a device for filling a pressurized gaseous hydrogen tank, comprising at least one source store containing a pressurized gaseous hydrogen at a determined first temperature and at a determined pressure, a member for heating up the gas stored in the source store, a filling circuit having an upstream end connected to the source store and a downstream end that can be coupled removably with the tank that is to be filled, at least one member for regulating the pressure and/or flow rate of gas allowed to circulate in the circuit from the source store to the tank, an electronic data acquisition, storage and processing member connected to the regulating member, also connected to the member for heating up the gas stored in the source store and to a sensor of the pressure in the tank, the electronic data acquisition, storage and processing member being configured to control the flow rate and/or pressure of the gas in the filling circuit, the electronic data acquisition, storage and processing member being configured to command the heating-up of the gas contained in the source store to a determined second temperature which is higher than the first temperature, during at least part of the transfer of hydrogen from the source store to the tank.

According to one possible specific characteristic, the heating member comprises a heat exchanger and/or a coolant circuit in a heat exchange relationship with the source tank.

The invention may also relate to any alternative device or method comprising any combination of the features hereinabove or hereinbelow.

BRIEF DESCRIPTION OF THE FIGURES

Other specifics and advantages will become apparent from reading the description hereinafter, given with reference to the figures in which.

DETAILED DESCRIPTION OF THE INVENTION

Figure 1:
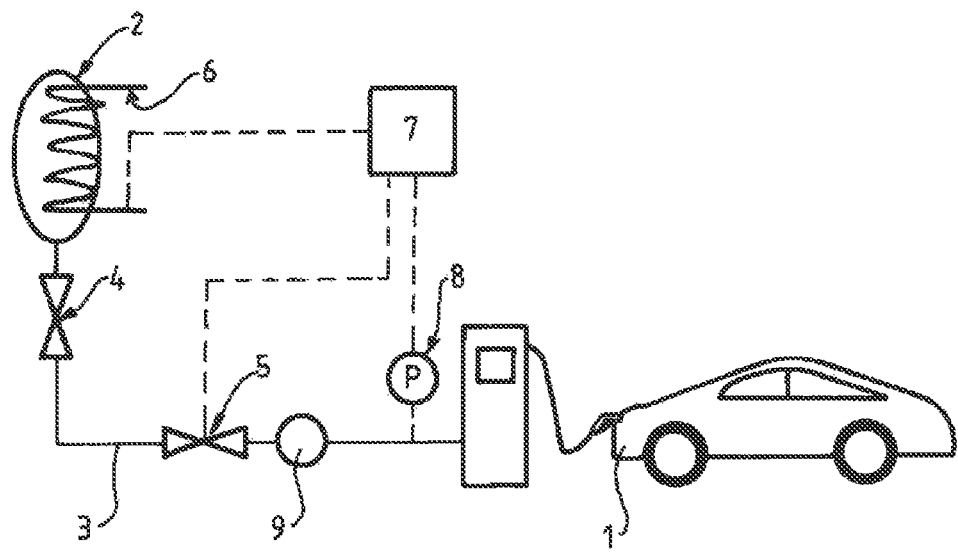
FIG. 1 depicts a schematic and partial view illustrating one example of a filling device that can implement the invention.

FIG. 1 schematically and partially depicts an example of a filling station for filling pressurized gaseous hydrogen tanks 1 (for example vehicle tanks).

The station in the conventional way comprises at least one source store 2 containing pressurized gaseous hydrogen, for example at a pressure comprised between 150 bar and 1000 bar, notably 700 to 900 bar. The source stores 2 are, for example, at ambient temperature or kept at a determined temperature (for example at 15° C. or 0° C.).

The station further comprises a filling circuit 3 having an upstream end connected to the source store(s) 2 and a downstream end that can be coupled removably with the tank 1 that is to be filled. The filling circuit 3 for example comprises an isolation valve 4 and a member 5 for regulating the pressure and/or the flow rate of gas allowed to circulate in the circuit 3 from the source store 2 to the tank 1. The regulating member 5 comprises for example a valve, which may or may not be controlled, a pressure regulator or any other suitable member for controlling the flow rate of gas or the rise in pressure in the tank 1 that is to be filled.

The station further comprises a sensor 8 of pressure in the tank, this being situated for example in the filling circuit 3 upstream of the tank 1. Of course, this sensor 8 may be replaced or supplemented by a pressure sensor in the tank 1, around the tank and/or by software modeling calculating this pressure.

As illustrated schematically, the filling circuit 3 may further comprise a heat exchanger 9 in a heat exchange relationship with the gas downstream of the member 5 so as if appropriate to regulate the temperature of the gas (notably in order to cool the gas).

The station further preferably comprises an electronic data acquisition, storage and processing member 7, for example a programmable controller, a processor, a computer or any other device with a microprocessor or the like.

The electronic data acquisition, storage and processing member 7 is connected to the regulating member 5 and to the member 6 for heating up the gas stored in the source store 2 in order to command/control these. In addition, the electronic data acquisition, storage and processing member 7 is connected to the sensor 8 of the pressure in the tank 1 in order to collect the signal therefrom. The electronic data acquisition, storage and processing member 7 may also be connected to a sensor measuring the pressure and/or temperature in the source store 2 or at the outlet thereof.

The station further comprises a member 6 for heating up the gas stored in the source store 2.

In the conventional way, the electronic data acquisition, storage and processing member 7 is configured to control the flow rate and/or pressure of the gas in the filling circuit so as to optimize the filling (determined duration, quantity transferred, without generating heating above a prescribed threshold, determined for example by the nature of the tank 1).

According to one advantageous feature, the electronic data acquisition, storage and processing member 7 is also configured to command the heating-up of the gas contained in the source store 2 to a determined temperature which is higher than the current temperature for at least part of the transfer of hydrogen from the source store 2 to the tank 1.

For preference, this heating-up is performed at the end of the transfer of gas between the source store 2 and the tank 1.

For example, during a filling, when (or just before) the pressure differential between, on the one hand, the gas in the source store 2 and, on the other hand, the gas in the tank 1, reaches a value below a determined first differential, the gas contained in the source store 2 is heated up via the heating member 6.

For preference, this heating is performed only when the pressure differential between, on the one hand, the gas in the source store 2 and, on the other hand, the gas in the tank 1, is below said determined first differential.

This determined first differential is comprised for example between 50 and 250 bar and preferably comprised between 100 and 200 bar.

The heating-up of the gas contained in the source store 2 may be intended to increase its temperature by a determined amount for example comprised between 10° C. to 60° C. and preferably between 20° C. to 40° C., notably 30° C.

This heating-up makes it possible to increase the pressure of the gas in the source store 2 and thus makes it possible to maximize the pressure differential between the source 2 and the receiving tank 1.

Specifically, as the pressure difference between the source store 2 and the tank 1 reduces (the pressure in the source tank decreases in favor of the tank 1), the inventors have determined that it is advantageous to heat up the gas in the source store 2.

Thus, the pressure differential can be increased, maintained or failing this its decrease can be minimized for as long as possible to improve the efficiency of the filling.

The final pressure in the source store 2 (give or take its heating-up) will be lower than that obtained in the methods of the prior art (without heating). What that means is that the tank 1 will be better filled (better filling efficiency for a given time) and better use will be made of the source store 2 (it will be better emptied).

Of course, at the start of filling, notably when the pressure differential is great (more than 200 bar for example), the gas may be cooled (for example via an exchanger 9 downstream of the regulating member 5 and/or via exchange of heat directly at the source store 2). This well known cooling makes it possible to minimize the heating in the tank 1, particularly at the start of filling when the expansion of the hydrogen produces additional heating through the Joule-Thomson effect in addition to the effect of compression.

At the end of filling, the tank 1 is able to tolerate a relatively hotter gas.

In the case for example of a source store 2 containing gaseous hydrogen at a pressure of 700 bar and a temperature of 15° C., heating this gas up to 45° C. (for example at constant density) makes it possible to attain a pressure of around 775 bar in the store 2.

The invention is particularly advantageous in instances in which a compressor is used in the filling station because the need to use the compressor can be reduced.

In addition, the heating-up of a coolant that cools the gas may if appropriate be used to heat up the source store 2.

The method is particularly advantageous for relatively lengthy filling times, which means to say those lasting between ten minutes and sixty minutes. The method may also be applied to quick fills (lasting between two and ten minutes for example).

Figure 2:
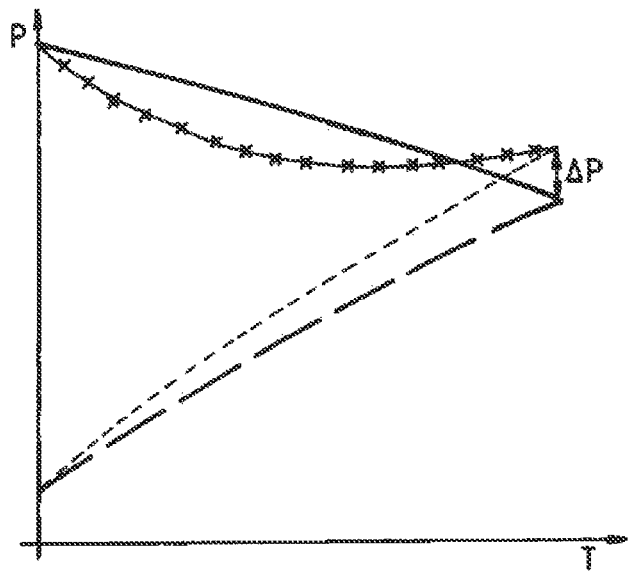
FIG. 2 depicts comparative curves of the variation in pressure within the source stores and tanks when filling with and without implementing the invention.

FIG. 2 schematically illustrates the effects of the invention with respect to the prior art.

The curves in continuous line and with crosses indicate the variation in pressure in the source store 2 respectively without and with the heating according to the invention.

The curves in discontinuous long and short line depict the variation in pressure in the tank filled respectively without and with the heating according to the invention.

Thus, at the start of filling, the source store gas is cooled or no thermal action is performed on it. It may for example have been precooled to a temperature of −30° C. for example.

Filling is initiated, the pressure in the source store 2 decreases and that in the target tank 1 increases.

When for example the pressure differential between the two containers is below a threshold differential, for example of the order of 100 to 200 bar, the gas in the source store 2 may be heated up. The heating may consist in achieving an increase of +30° C. with respect to the initial temperature, or even with respect to ambient temperature. For example, in the case of an ambient temperature comprised between −20° C. and +40° C., the gas may be heated up to 70° C. for example.

The inventors have also demonstrated that the solution described hereinabove may offer advantages in terms of energy balance.

Specifically, for a store of a volume of 0.5 m$^3$ or more, the heating makes it possible to reduce the use of a compressor. Depending on the installation conditions, the economic balance is positive when the period of use of a compressor reaches a certain value (for example 120 seconds).

Let us consider a filling station which delivers gas at compressor outlet at a temperature of 30° C. and which is cooled downstream to a temperature of −40° C. If the gas in the source store 2 is at 15° C. and is heated to a temperature of 45° C., that means that the gas needs to be cooled from the temperature of 45° C. down to a temperature of −40° C. The energy consumption of the cold unit is in this case increased by 1265 kJ.

According to the invention, it is possible to reuse the heat energy dissipated in the cold unit (exchanger 9) to heat up the source store 2.

It is possible for example to recuperate between 50% and 100% of the energy dissipated in the cooling unit 9. In addition, other heat sources may be used within the filling station (compressors, etc.).

In the special circumstances of a vehicle having a tank at a pressure of 100 bar and a source store 2 storing hydrogen in a volume of 0.75 m$^3$ at a pressure of 855 bar, the heating of the gas of the source store 2 to a temperature of 55° C. would make it possible to completely fill the tank by equalizing of pressure without using the compressor, in contrast to a solution without heating.

In general, the invention allows the insertion of a further 0.3 kg of hydrogen in comparison with the prior art solution without heating. That corresponds to a saving of approximately 25 to 30 seconds of compressor operation.

In order to increase the saving on the use of a compressor, the compressor could be started in staggered time (not right from the start of filling).

Under particular conditions for example, the time for which it is beneficial to operate the compressor, initially 1.12 min, could be reduced to 0.72 min for example.

The invention makes it possible for example to reduce the size and power of compressor required.

Thus, depending on the conditions of use, the energy savings of the invention vary in magnitude.

Of course, the invention may be applied to any other type of gas other than hydrogen. In addition, the invention may be applied to an installation (station) using several source stores 2 coupled in parallel and used in succession or simultaneously.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising", "Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

What is claimed is:

1. A method for filling a pressurized gaseous hydrogen tank from at least one source store containing a pressurized gaseous hydrogen at a determined first temperature and at a determined pressure higher than a pressure in the tank that is to be filled, comprising the steps of:

transferring hydrogen from the source store to the tank by an equalizing of pressure via a filling circuit having an upstream end connected to the source store and a downstream end connected to the tank, the at least one source store being in a heat exchange relationship with a heater that is adapted and configured to heat up the gas stored in the source store; and during at least part of the transfer of hydrogen from the source store to the tank, the hydrogen contained in the source store is heated up to a determined second temperature which is higher than the first temperature, wherein when a pressure differential between the gas in the source store and the gas in the tank, is below a determined first differential, the gas contained in the source store is heated up via the heater.

2. The method of claim 1, wherein the heating of the gas contained in the source store increases the temperature of the gas being heated up by a determined amount between 10° C. to 60° C.

3. The method of claim 1, wherein the gas contained in the source store is heated up only when the pressure differential is below said determined first differential.

4. The method of claim 1, wherein the determined first differential is between 50 and 250 bar.

5. The method of claim 1, wherein when the pressure differential is above a determined second differential, the gas contained in or withdrawn from the source store is cooled.

6. The method of claim 5, wherein the cooling of the gas contained in the source store reduces its temperature by 10° C. to 60° C.

7. The method of claim 5, wherein the cooling of the gas contained in the source store reduces its temperature by 20° C. to 40° C.

8. The method of claim 1, wherein the gas in the source store has an initial pressure prior to filling and prior to heating between 150 and 950 bar.

9. The filling device of claim 8, wherein the heater comprises a heat exchanger and/or a coolant circuit in a heat exchange relationship with the source tank.

10. The method of claim 1, wherein the heating of the gas contained in the source store increases the temperature of the gas being heated up by a determined amount between 20° C. to 40° C.

11. The method of claim 1, wherein the determined first differential is between 100 and 200 bar.

12. The method of claim 1, wherein the gas in the source store has an initial pressure prior to filling and prior to heating between 250 and 850 bar.

13. A device for filling a pressurized gaseous hydrogen tank, comprising:

at least one source store containing pressurized gaseous hydrogen at a determined first temperature and at a determined pressure;

a heater adapted and configured to heat up the gas stored in the source store;

a filling circuit having an upstream end connected to the source store and a downstream end adapted and configured to be coupled removably with the tank that is to be filled;

a regulator adapted and configure to regulate a pressure and/or flow rate of gas in the filling circuit;

a pressure sensor adapted and configured to sense a pressure in the tank;

an electronic data acquisition, storage and processing member that is connected to the regulator, connected to the heater, and connected to the sensor, wherein the electronic data acquisition, storage and processing member is adapted and configured to:

control the flow rate and/or pressure of the gas in the filling circuit via the regulator, and command the heating-up of the gas contained in the source store, via the heater, to a determined second temperature which is higher than the first temperature during at least part of the transfer of hydrogen from the source store to the tank when a pressure differential between the gas in the source store and the gas in the tank is below a determined first differential.

* * * * *